(12) United States Patent
Lee et al.

(10) Patent No.: US 10,826,100 B2
(45) Date of Patent: Nov. 3, 2020

(54) POLYMER ELECTROLYTE MEMBRANE, ELECTROCHEMICAL CELL AND FLOW CELL COMPRISING SAME, METHOD FOR MANUFACTURING POLYMER ELECTROLYTE MEMBRANE, AND FLOW CELL ELECTROLYTE

(71) Applicant: LG CHEM, LTD., Seoul (KR)

(72) Inventors: Jeongbae Lee, Daejeon (KR); Tae Geun Noh, Daejeon (KR); Bong Hyun Jeong, Daejeon (KR); Geungi Min, Daejeon (KR); Sikwon Moon, Daejeon (KR); Sujin Byun, Daejeon (KR)

(73) Assignee: LG CHEM, LTD., Seoul (KR)

( * ) Notice: Subject to any disclaimer, the term of this patent is extended or adjusted under 35 U.S.C. 154(b) by 135 days.

(21) Appl. No.: 15/536,867

(22) PCT Filed: Apr. 7, 2016

(86) PCT No.: PCT/KR2016/003648
§ 371 (c)(1),
(2) Date: Jun. 16, 2017

(87) PCT Pub. No.: WO2016/163773
PCT Pub. Date: Oct. 13, 2016

(65) Prior Publication Data
US 2017/0346124 A1 Nov. 30, 2017

(30) Foreign Application Priority Data

Apr. 8, 2015 (KR) .................. 10-2015-0049570

(51) Int. Cl.
*H01M 8/18* (2006.01)
*C25B 9/10* (2006.01)
(Continued)

(52) U.S. Cl.
CPC ............. *H01M 8/188* (2013.01); *C25B 9/10* (2013.01); *H01M 8/1048* (2013.01);
(Continued)

(58) Field of Classification Search
CPC . H01M 2008/1095; H01M 2300/0082; H01M 8/1053; H01M 8/1018
See application file for complete search history.

(56) References Cited

U.S. PATENT DOCUMENTS

| | | |
|---|---|---|
| 4,270,984 A | 6/1981 | Giner et al. |
| 4,882,241 A | 11/1989 | Heinzel |

(Continued)

FOREIGN PATENT DOCUMENTS

| | | |
|---|---|---|
| CN | 101136480 A | 3/2008 |
| CN | 101635363 A | 1/2010 |

(Continued)

OTHER PUBLICATIONS

International Search Report issued in PCT/KR2016/003648 (PCT/ISA/210), dated Sep. 2, 2016.

(Continued)

*Primary Examiner* — Imran Akram
(74) *Attorney, Agent, or Firm* — Birch, Stewart, Kolasch & Birch, LLP

(57) ABSTRACT

The present specification relates to a polymer electrolyte membrane, an electrochemical battery including the polymer electrolyte membrane, an electrochemical battery module including the electrochemical battery, a flow battery including the polymer electrolyte membrane, a method for manufacturing a polymer electrolyte membrane, and an electrolyte solution for a flow battery.

16 Claims, 9 Drawing Sheets

(51) Int. Cl.
  *H01M 8/1048*  (2016.01)
  *H01M 8/1041*  (2016.01)
  *H01M 8/1067*  (2016.01)
  *H01M 8/0236*  (2016.01)
  *H01M 8/0245*  (2016.01)
  *H01M 8/0234*  (2016.01)

(52) U.S. Cl.
  CPC ....... *H01M 8/1055* (2013.01); *H01M 8/1067* (2013.01); *H01M 8/0234* (2013.01); *H01M 8/0236* (2013.01); *H01M 8/0245* (2013.01); *H01M 2300/0082* (2013.01); *H01M 2300/0094* (2013.01); *Y02E 60/50* (2013.01); *Y02P 70/50* (2015.11)

(56) References Cited

U.S. PATENT DOCUMENTS

| | | |
|---|---|---|
| 6,242,122 B1 | 6/2001 | Dohle et al. |
| 8,771,857 B2 | 7/2014 | Shigematsu et al. |
| 2002/0102450 A1* | 8/2002 | Badding ............ H01M 8/0206 429/465 |
| 2003/0170520 A1* | 9/2003 | Fujii ................. H01M 8/1097 429/432 |
| 2006/0228613 A1* | 10/2006 | Bourgeois ........... H01M 8/0282 429/432 |
| 2008/0075999 A1* | 3/2008 | Izuhara ................. C08J 5/2218 429/450 |
| 2008/0268314 A1 | 10/2008 | Han et al. |
| 2008/0274385 A1* | 11/2008 | Creeth .................... H01M 8/20 429/492 |
| 2009/0087715 A1* | 4/2009 | Jang .................... H01M 8/1023 429/483 |
| 2010/0015493 A1* | 1/2010 | Adachi ............... H01M 8/1004 429/483 |
| 2010/0075203 A1* | 3/2010 | Braeuninger ........ H01M 8/1011 429/483 |
| 2010/0196782 A1* | 8/2010 | Izuhara ............... H01M 8/1072 429/483 |
| 2011/0165454 A1* | 7/2011 | Iwamoto ............. H01M 2/1094 429/163 |
| 2012/0045680 A1 | 2/2012 | Dong et al. |
| 2012/0282509 A1 | 11/2012 | Shigematsu et al. |
| 2014/0335440 A1* | 11/2014 | Kunita ............... C08G 65/4043 429/492 |
| 2015/0236367 A1* | 8/2015 | Kim .................... H01M 8/1039 429/482 |
| 2015/0311541 A1* | 10/2015 | Lloyd ................. H01M 8/1062 429/509 |
| 2015/0364791 A1* | 12/2015 | Vu .......................... H01M 4/62 429/306 |
| 2016/0013506 A1 | 1/2016 | Dong et al. |
| 2017/0189861 A1* | 7/2017 | Kang ..................... B01D 71/62 |

FOREIGN PATENT DOCUMENTS

| | | |
|---|---|---|
| DE | 10010399 A1 | 9/2001 |
| EP | 2876717 A1 | 5/2015 |
| JP | 2001-504264 A | 3/2001 |
| JP | 2009-238515 A | 10/2009 |
| KR | 10-2007-0035712 A | 4/2007 |
| KR | 10-2008-0050872 A | 6/2008 |
| KR | 10-2009-0046087 A | 5/2009 |
| KR | 10-2011-0119775 A | 11/2011 |
| KR | 10-2012-0132620 A | 12/2012 |
| KR | 10-2013-0113177 A | 10/2013 |
| KR | 10-2014-0046774 A | 4/2014 |
| KR | 10-2015-0033731 A | 4/2015 |
| WO | WO 2015/019972 A1 | 2/2015 |
| WO | WO 2015/019973 A1 | 2/2015 |

OTHER PUBLICATIONS

Extended European Search Report for European Application No. 16776876.1, dated Oct. 17, 2018.

* cited by examiner

[Figure 1]
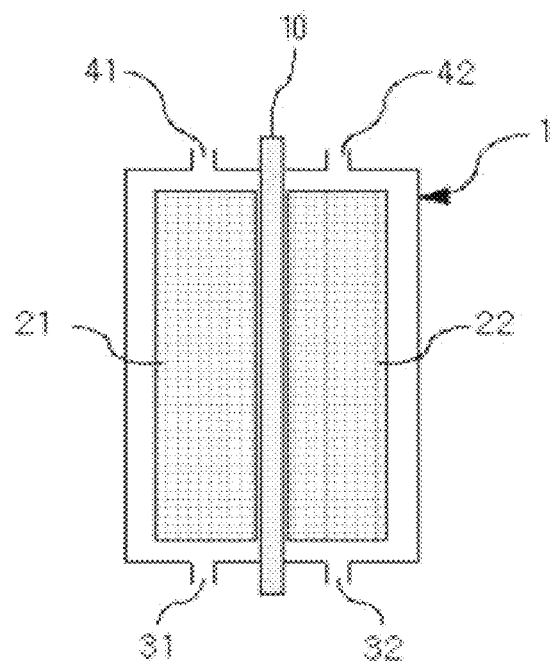

[Figure 2]
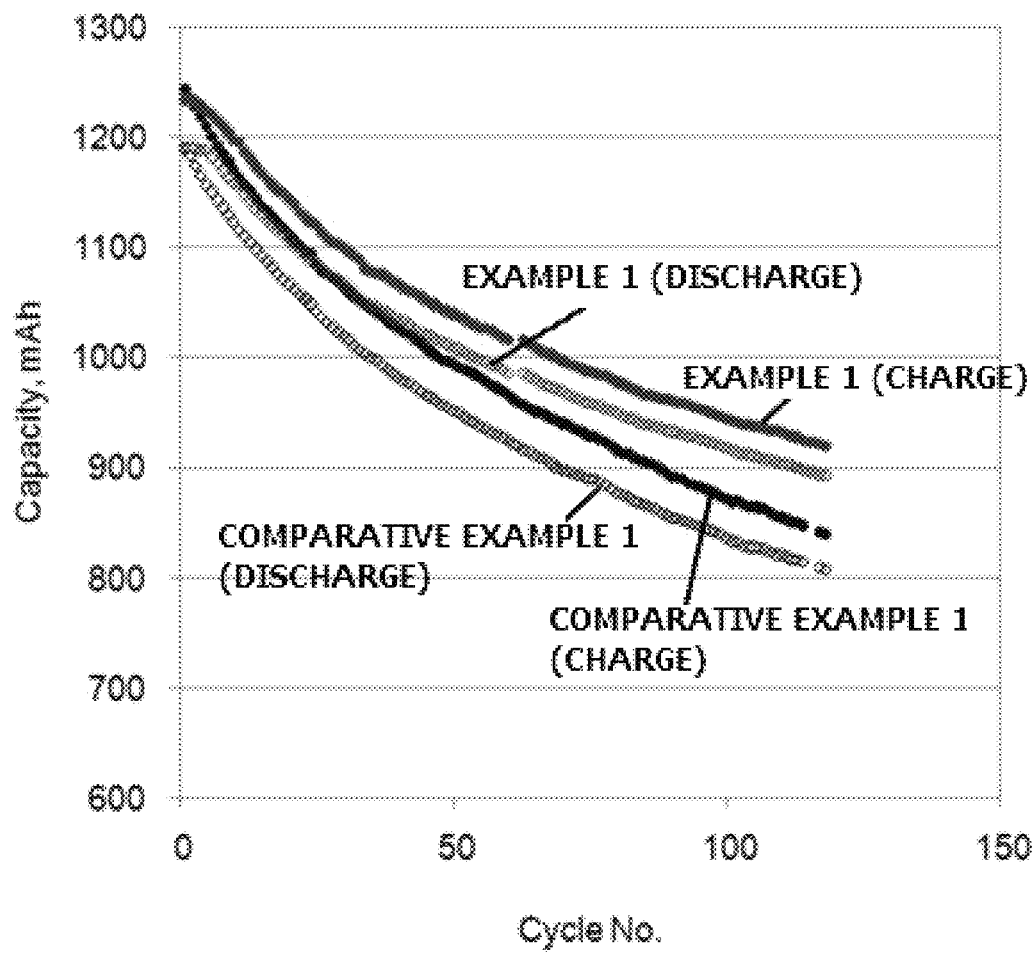

[Figure 3]
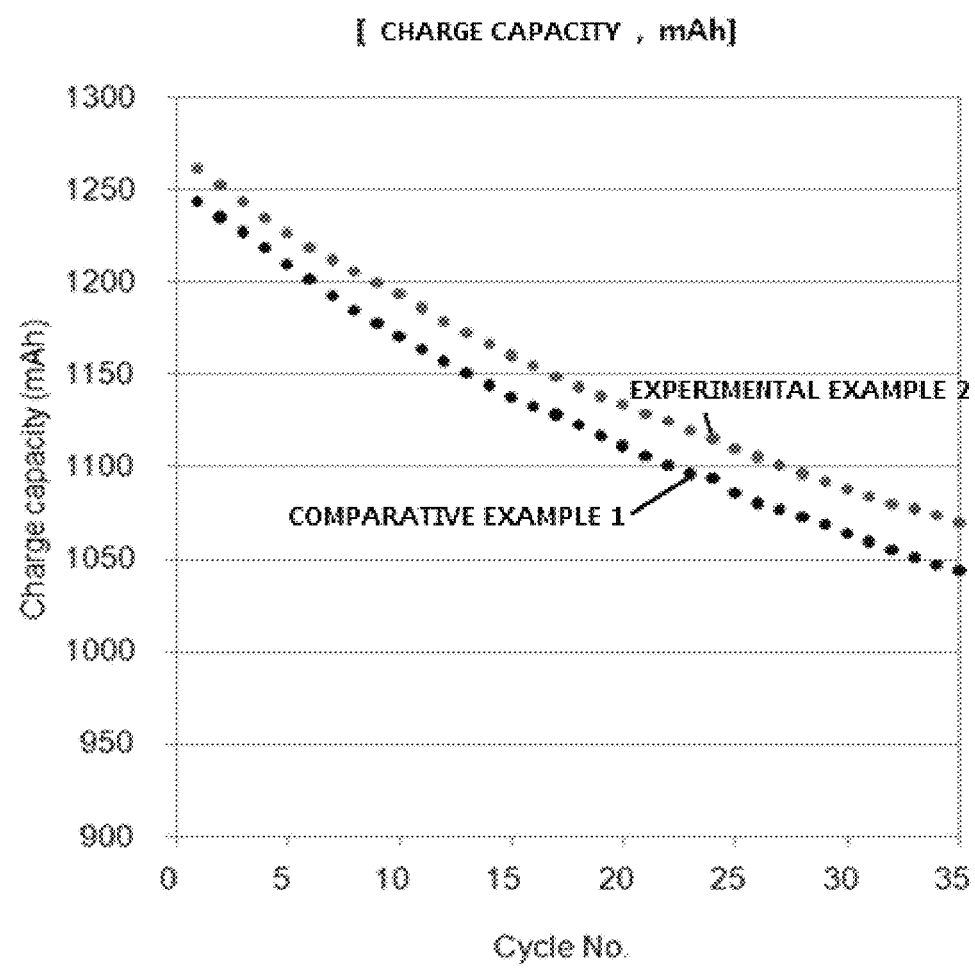

[Figure 4]
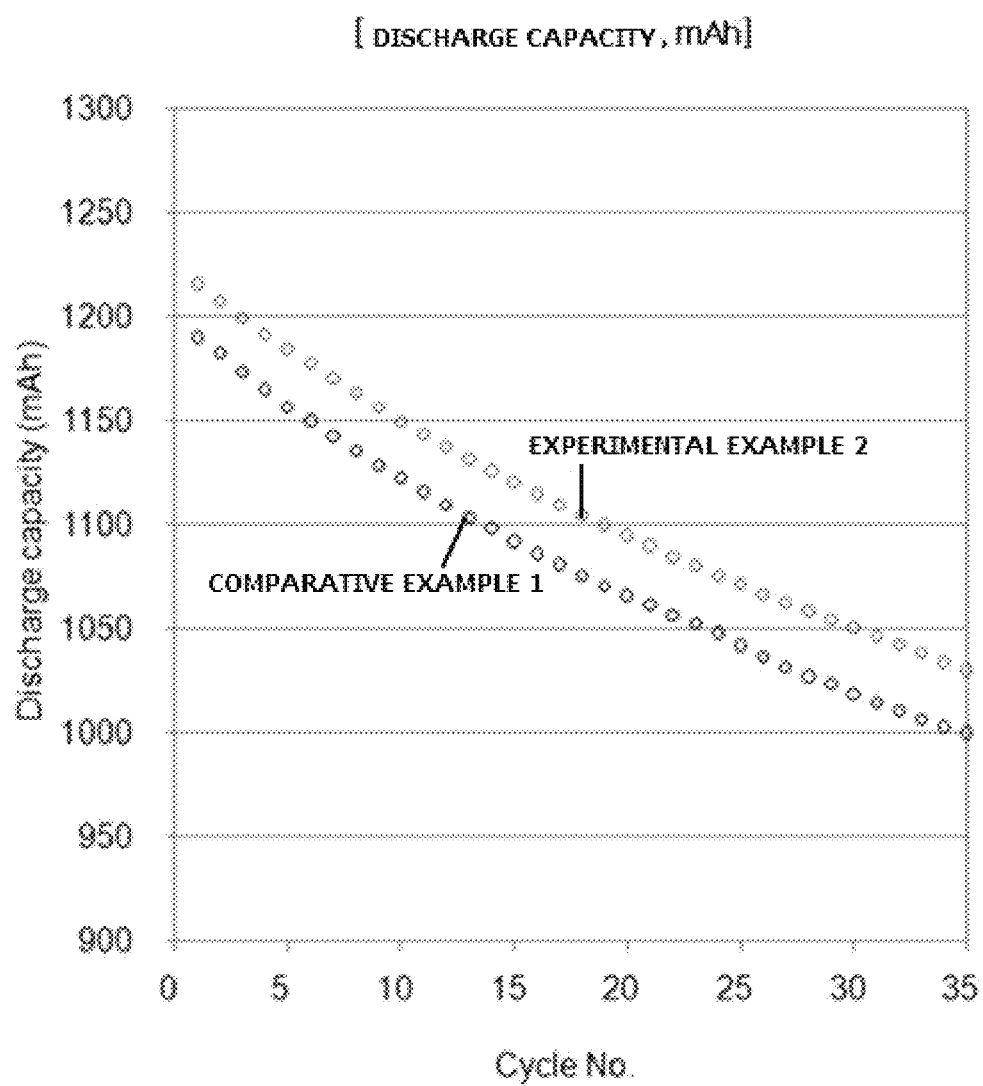

[Figure 5]
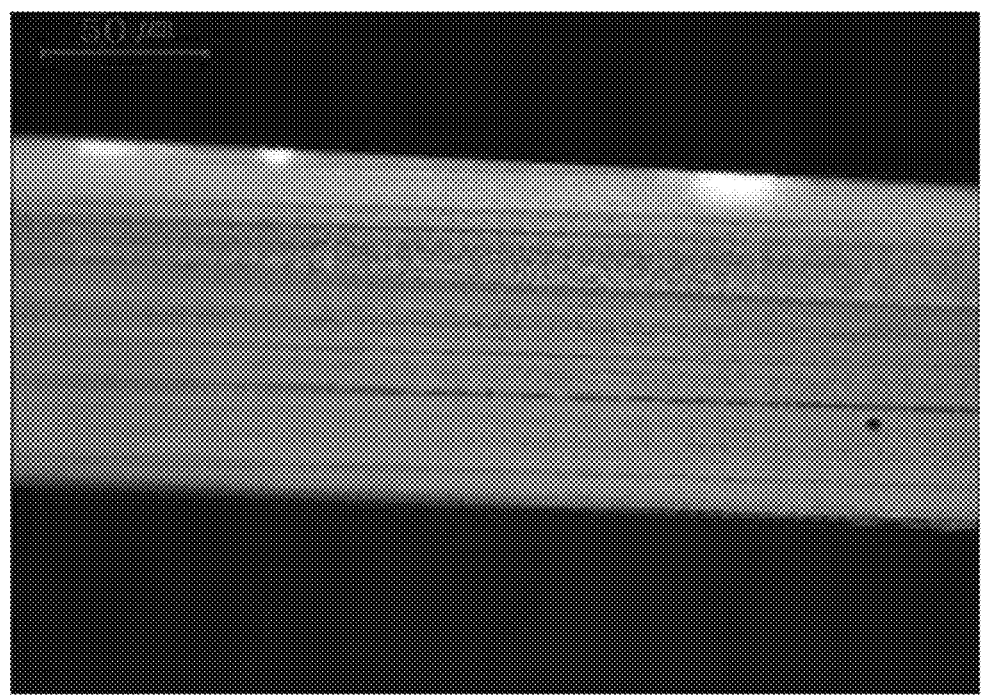

[Figure 6]
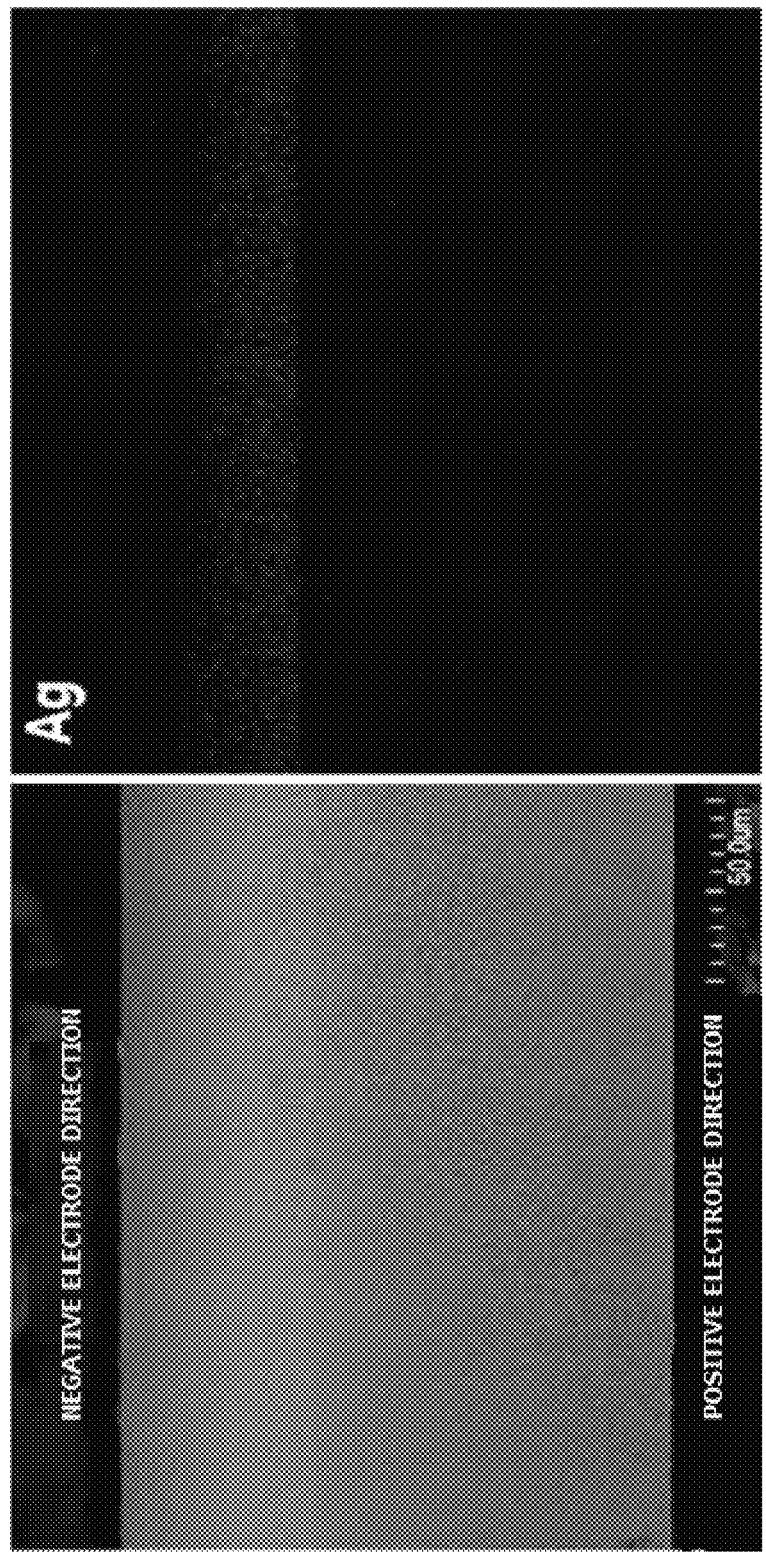

[Figure 7]
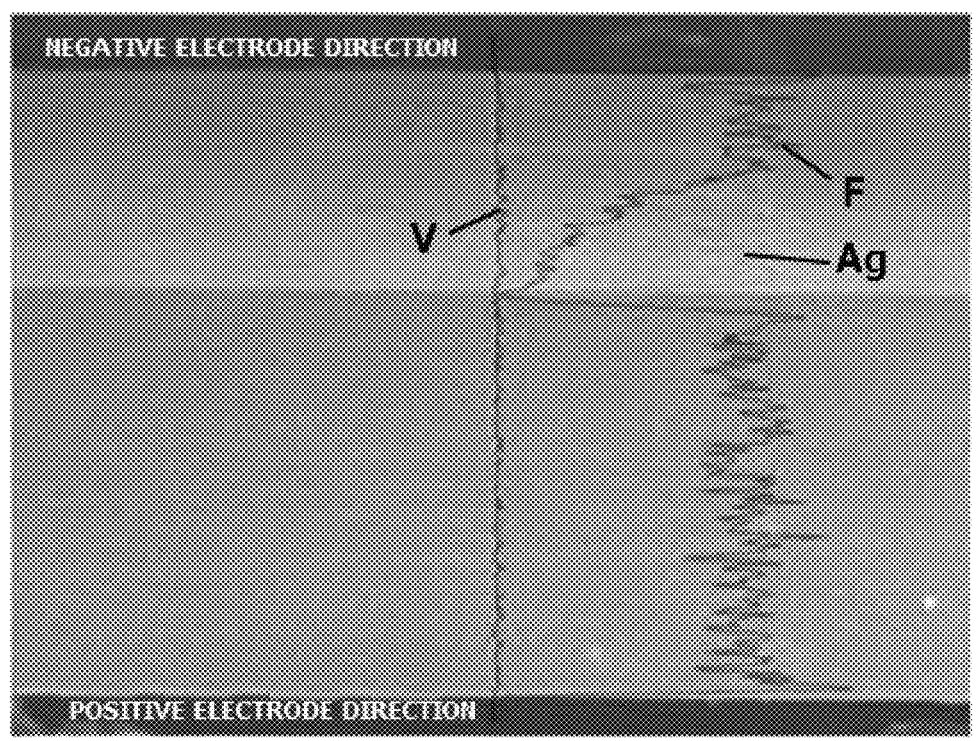

[Figure 8]
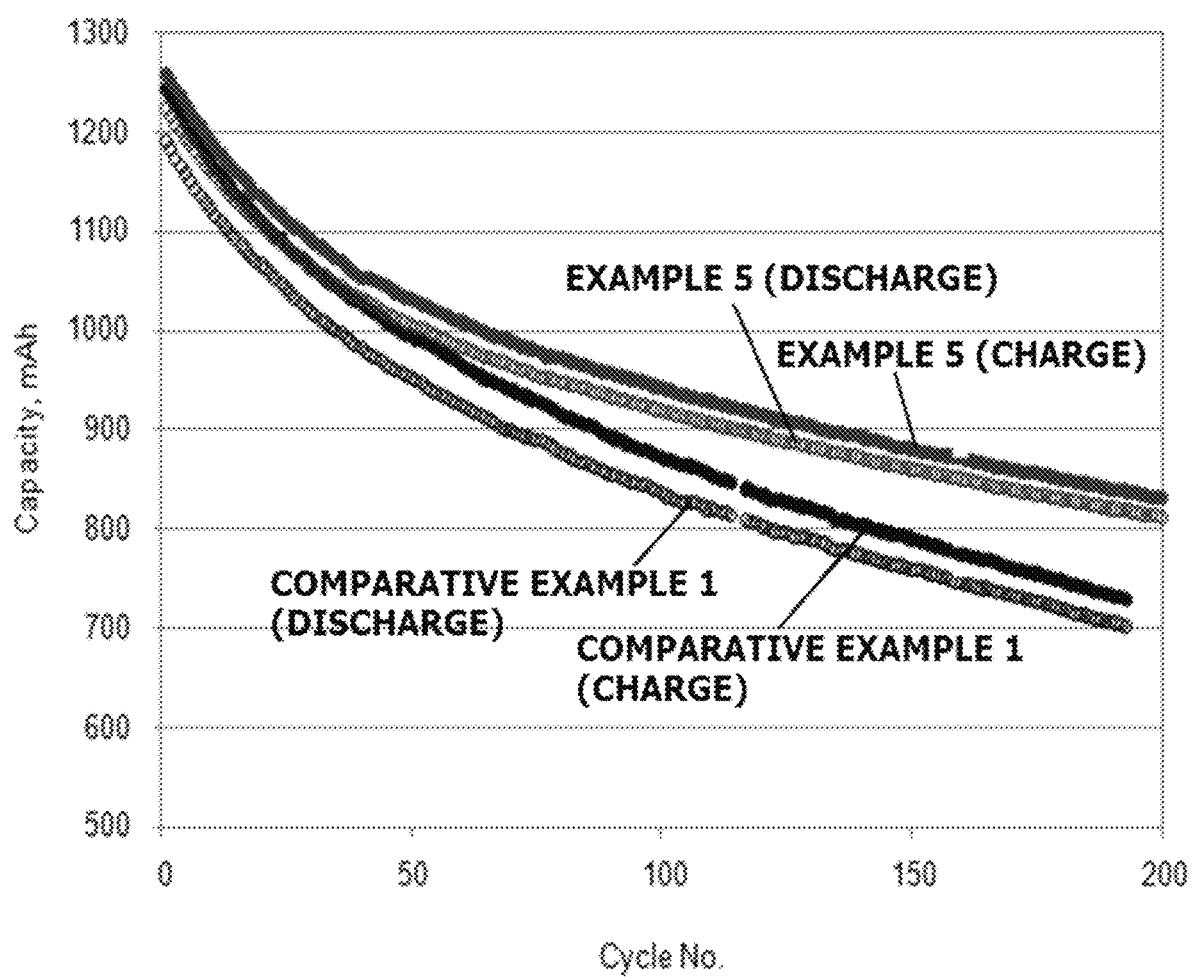

[Figure 9]
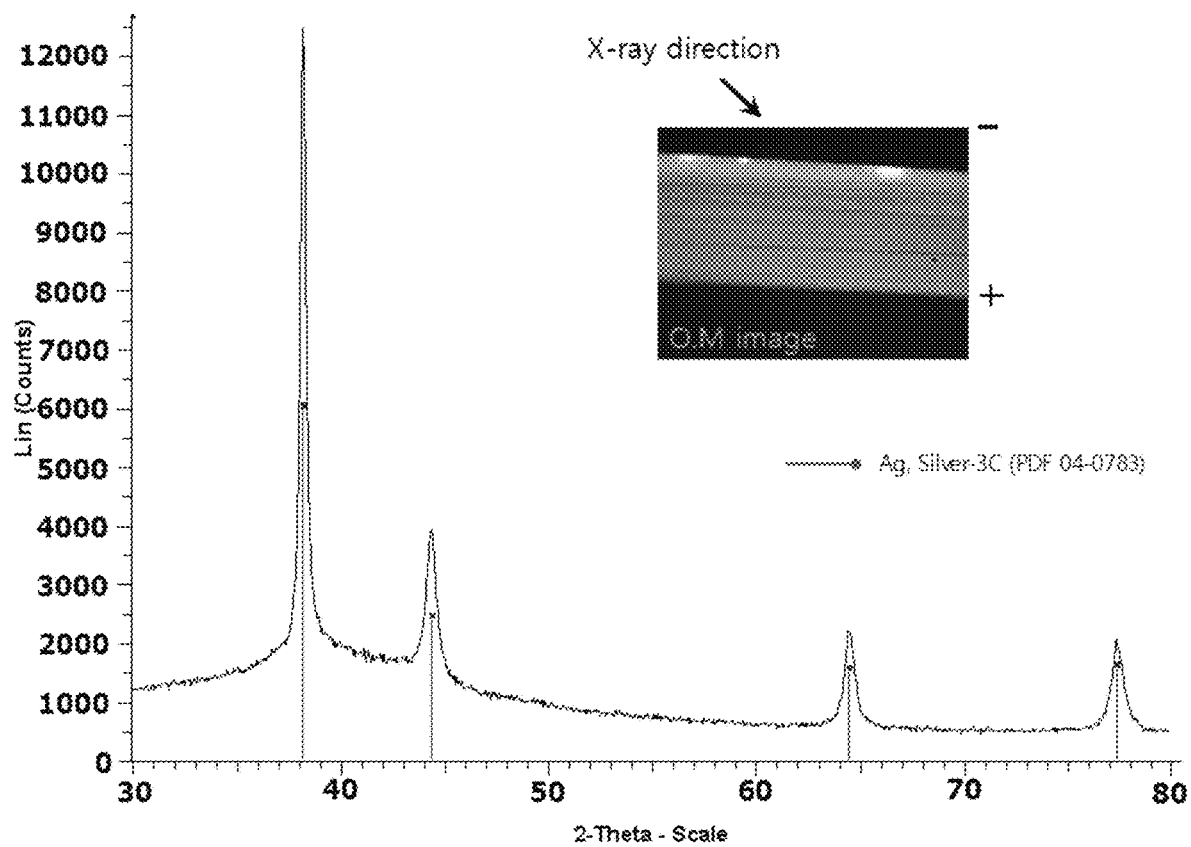

POLYMER ELECTROLYTE MEMBRANE, ELECTROCHEMICAL CELL AND FLOW CELL COMPRISING SAME, METHOD FOR MANUFACTURING POLYMER ELECTROLYTE MEMBRANE, AND FLOW CELL ELECTROLYTE

TECHNICAL FIELD

The present invention claims priority to and the benefit of Korean Patent Application No. 10-2015-0049570 filed in the Korean Intellectual Property Office on Apr. 8, 2015, the entire contents of which are incorporated herein by reference.

The present specification relates to a polymer electrolyte membrane, an electrochemical battery including the polymer electrolyte membrane, an electrochemical battery module including the electrochemical battery, a flow battery including the polymer electrolyte membrane, a method for manufacturing a polymer electrolyte membrane, and an electrolyte solution for a flow battery.

BACKGROUND ART

A power storage technology is an important technology for efficient use of power, improvement of performance or reliability of a power supply system, and overall efficient use of energy such as expansion of introduction of new renewable energy having a large variation width depending on time and energy regeneration of a moving object, and a development possibility of the power storage technology and a demand for social contribution thereof have been gradually increased.

In order to adjust a supply-demand balance of a semi-autonomous local power supply system such as a microgrid, appropriately distribute non-uniform output of development of the new renewable energy such as wind power or solar energy generation, and control an influence of voltage and frequency changes generated by a difference from an existing electric power system, and the like, studies on secondary batteries have been actively conducted, and expectations with respect to the utilization of the secondary batteries have been increased in these fields.

Referring to characteristics required for a secondary battery to be used for storing high-capacity power, the secondary battery needs to have a high energy storage density, and a flow battery has been most spotlighted as a secondary battery having high capacity and high efficiency, which is the most appropriate for the characteristic.

The flow battery is configured such that electrodes of a positive electrode and a negative electrode are disposed on both sides of a separator, respectively.

The flow battery includes bipolar plates which are provided outside the electrodes, respectively, for the purpose of electrical conduction, positive and negative electrode tanks which accommodate an electrolyte, an inlet into which the electrolyte flows, and an outlet from which the electrolyte is discharged again.

DETAILED DESCRIPTION OF THE INVENTION

Technical Problem

The present specification has been made in an effort to provide a polymer electrolyte membrane, an electrochemical battery including the polymer electrolyte membrane, an electrochemical battery module including the electrochemical battery, a flow battery including the polymer electrolyte membrane, a method for manufacturing a polymer electrolyte membrane, and an electrolyte solution for a flow battery.

Technical Solution

The present specification provides a polymer electrolyte membrane including a cross-over prevention layer provided therein, in which the cross-over prevention layer has a thickness of 1 μm or more and 100 μm or less.

Further, the present specification provides a polymer electrolyte membrane including a cross-over prevention layer provided therein, in which the cross-over prevention layer is disposed at 10% or more and 90% or less of a thickness of the electrolyte membrane from a surface of the polymer electrolyte membrane.

In addition, the present specification provides an electrochemical battery including a first electrode, a second electrode, and the polymer electrolyte membrane provided between the first electrode and the second electrode.

Furthermore, the present specification provides an electrochemical battery module including an electrochemical battery as a unit cell.

Further, the present specification provides a flow battery including: a first electrode which a first electrolyte solution including a first electrode active material is injected into and discharged from; a second electrode which a second electrolyte solution including a second electrode active material is injected into and discharged from; and the polymer electrolyte membrane which is disposed between the first electrode and the second electrode.

In addition, the present specification provides a method for manufacturing a polymer electrolyte membrane, the method including: installing an electrochemical battery including a first electrode, a second electrode, and a polymer electrolyte membrane provided between the first electrode and the second electrode; injecting a first electrolyte solution including a first electrode active material into a side of the first electrode and injecting a second electrolyte solution including a second electrode active material into a side of the second electrode, in which at least one of the first electrolyte solution and the second electrolyte solution includes metal cations; and manufacturing a polymer electrolyte membrane including a cross-over prevention layer formed therein, by operating the electrochemical battery to allow the metal cations to permeate into the polymer electrolyte membrane.

Furthermore, the present specification provides a method for manufacturing a polymer electrolyte membrane, the method including: impregnating a polymer electrolyte membrane with a solution including metal cations; installing an electrochemical battery including a first electrode, a second electrode, and the polymer electrolyte membrane provided between the first electrode and the second electrode; and manufacturing a polymer electrolyte membrane including a cross-over prevention layer formed therein by operating the electrochemical battery.

Further, the present specification provides an electrolyte solution for a flow battery, which includes an electrode active material and a cationic metal salt.

Advantageous Effects

The polymer electrolyte membrane of the present specification may minimize the cross-over of an electrode active material while maintaining ion transfer capability.

BRIEF DESCRIPTION OF DRAWINGS

FIG. 1 is a cross-sectional view illustrating a general structure of a flow battery.

FIG. 2 is a graph of the charge-discharge capacities of Example 1 and Comparative Example 1.

FIG. 3 is a graph of the discharge capacities of Experimental Example 2 and Comparative Example 1.

FIG. 4 is a graph of the charge capacities of Experimental Example 2 and Comparative Example 1.

FIG. 5 is an optical microscopy measurement image of Experimental Example 3.

FIG. 6 is a scanning electron microscopy with energy dispersive X-ray microanalysis (SEM/EDS) measurement image of Experimental Example 4.

FIG. 7 is an EDS line mapping image of Experimental Example 4.

FIG. 8 is a graph of the charge-discharge capacities of Example 5 and Comparative Example 1.

FIG. 9 is an X-ray diffraction measurement graph of Example 1.

EXPLANATION OF REFERENCE NUMERALS AND SYMBOLS

1: Housing
10: Separator
21: Negative electrode
22: Positive electrode
31: Negative electrode inlet
32: Positive electrode inlet
41: Negative electrode outlet
42: Positive electrode outlet

BEST MODE

Hereinafter, the present specification will be described in detail.

The present specification provides a polymer electrolyte membrane including a cross-over prevention layer provided therein. Since the cross-over prevention layer is provided inside the polymer electrolyte membrane, oxidation caused by exposure may not occur.

The cross-over prevention layer provided inside the polymer electrolyte membrane is provided so as not to be directly brought into contact with an electrolyte solution in an applied electrochemical battery. Specifically, the cross-over prevention layer may be spaced apart at least from the surface of a polymer electrolyte membrane, which is brought into contact with an electrolyte solution, so as not to be directly brought into contact with the electrolyte solution in the electrochemical battery.

The cross-over prevention layer may be disposed within a range of 10% or more and 90% or less of a thickness of a polymer electrolyte membrane from the surface of the polymer electrolyte membrane. In this case, since the cross-over prevention layer is not brought into contact with the electrolyte solution, there is an advantage in that oxidation does not occur.

The cross-over prevention layer may have a thickness of 1 μm or more and 100 μm or less. Specifically, the cross-over prevention layer may have a thickness of 10 μm or more and 50 μm or less. In this case, there is an advantage in that it is possible to maintain the selective exchange capacity of hydrogen ions of the polymer electrolyte membrane and suppress ions other than hydrogen ions from passing through the membrane.

For example, when the polymer electrolyte membrane is used for a vanadium flow battery, there is an advantage in that it is possible to maintain the selective exchange capacity of hydrogen ions of the polymer electrolyte membrane and selectively suppress vanadium ions from passing through the membrane.

For example, when the polymer electrolyte membrane is used for a fuel cell, there is an advantage in that it is possible to maintain the exchange capacity of ions of the polymer electrolyte membrane and selectively suppress fuel such as hydrogen and oxygen from passing through the membrane.

The cross-over prevention layer may be disposed at 10% or more and 90% or less of a thickness of the electrolyte membrane from the surface of the polymer electrolyte membrane, and may have a thickness of 1 μm or more and 100 μm or less.

The cross-over prevention layer may be parallel to a surface perpendicular to a thickness direction of the polymer electrolyte membrane. In this case, the cross-over prevention layer can be uniformly distributed, and the thickness and position of the cross-over prevention layer can be controlled, and since the cross-over prevention layer is present to be parallel to an active surface of the electrolyte membrane, it is possible to effectively suppress a phenomenon in which other ions except for hydrogen ions pass through the membrane.

The cross-over prevention layer may include a cationic metal. Here, the cationic metal means a metal that can be dissociated into a cation.

The cationic metal may include at least one of a Group I metal, a Group II metal, a Group XI metal, a Group XII metal, a Group XIII metal, a Group XIV metal, a Group XV metal, and a Group XVI metal in the periodic table.

The cationic metal may include at least one of molybdenum (Mo), tin (Sn), lead (Pb), copper (Cu), mercury (Hg), silver (Ag), and palladium (Pd).

A material for the polymer electrolyte membrane is not particularly limited as long as the material can transfer ions, and those generally used in the art may be selected.

The polymer electrolyte membrane may include an ion conductive polymer. The polymer electrolyte membrane may be composed of an ion conductive polymer, or may include an ion conductive polymer in pores of a porous body.

The ion conductive polymer is not particularly limited as long as the polymer is a material that can exchange ions, and those generally used in the art may be used.

The ion conductive polymer may be a hydrocarbon-based polymer, a partially fluorine-based polymer, or a fluorine-based polymer.

The hydrocarbon-based polymer may be a hydrocarbon-based sulfonated polymer having no fluorine group, and in contrast, the fluorine-based polymer may be a sulfonated polymer which is saturated with a fluorine group, and the partially fluorine-based polymer may be a sulfonated polymer which is not saturated with a fluorine group.

The ion conductive polymer may be one polymer or two or more polymers selected from the group consisting of a perfluorosulfonic acid-based polymer, a hydrocarbon-based polymer, an aromatic sulfone-based polymer, an aromatic ketone-based polymer, a polybenzimidazole-based polymer, a polystyrene-based polymer, a polyester-based polymer, a polyimide-based polymer, a polyvinylidene fluoride-based polymer, a polyethersulfone-based polymer, a polyphenylene sulfide-based polymer, a polyphenylene oxide-based polymer, a polyphosphazene-based polymer, a polyethylene naphthalate-based polymer, a polyester-based polymer, a doped polybenzimidazole-based polymer, a polyether ketone-based polymer, a polyphenylquinoxaline-based polymer, a polysulfone-based polymer, a polypyrrole-based polymer, and a polyaniline-based polymer. The polymer may be a single copolymer, an alternative copolymer, a random copolymer, a block copolymer, a multi-block copolymer, or a graft copolymer, but is not limited thereto.

The ion conductive polymer may be a cation conductive polymer, and may include at least one of, for example, Nafion, sulfonated polyether ether ketone (sPEEK), sulfonated polyether ketone (sPEK), poly(vinylidene fluoride)-graft-poly(styrene sulfonic acid) (PVDF-g-PSSA), and sulfonated poly(fluorenyl ether ketone).

The porous body is not particularly limited in structure and material as long as the porous body includes a plurality of pores, and those generally used in the art may be used.

For example, the porous body may include at least one of polyimide (PI), Nylon, polyethylene terephthalate (PET), polytetrafluoro ethylene (PTFE), polyethylene (PE), polypropylene (PP), poly(arylene ether sulfone) (PAES), and polyether ether ketone (PEEK).

It is preferred that the polymer electrolyte membrane is composed of an ion conductive polymer. In this case, there is an advantage in that when a cross-over prevention layer is formed inside the polymer electrolyte membrane, a uniform layer may be formed without being affected by a porous body.

According to an exemplary embodiment of the present specification, the polymer electrolyte membrane may include a fluorine-based ion conductive polymer. In this case, there is an advantage in that the polymer electrolyte membrane has stable chemical resistance.

The thickness of the polymer electrolyte membrane is not particularly limited, but may be, for example, 5 μm or more and 200 μm or less, specifically 10 μm or more and 200 μm or less, and more specifically 20 μm or more and 200 μm or less.

In a flow battery, an electrode active material included in an electrolyte solution passes through a polymer electrolyte membrane, and as a result, there may occur a cross-over phenomenon in which the electrode active material passes through the membrane to a counter electrode. In this case, since the ion concentration and balance of the vanadium oxidation and reduction ion species between both electrodes are broken, the capacity and efficiency of the battery are reduced.

Further, in the case of a low temperature type fuel cell such as a direct methanol fuel cell (DMFC) and a proton exchange membrane fuel cell (PEMFC), there may occur a cross-over phenomenon in which a fuel electrode active material passes through a polymer electrolyte membrane. Since the aforementioned phenomenon reduces oxidation/reduction capability of the counter electrode and forms an overvoltage, the capacity and efficiency of the battery are reduced.

In order to minimize the cross-over phenomenon, an organic and inorganic composite may be introduced as an ion transfer channel of a polymer electrolyte membrane by immersing the polymer electrolyte membrane in a solution in which the organic and inorganic composite is dissolved or dispersed. A specific method for introducing an organic and inorganic composite is a method for introducing an organic and inorganic composite by subjecting functional groups of a polymer electrolyte membrane to ion exchange, or forming a complex with functional groups of a polymer electrolyte membrane, and the aforementioned method cannot selectively control a position into which the organic and inorganic composite is introduced.

As another method for minimizing the cross-over phenomenon, an organic and inorganic composite may be introduced into a polymer electrolyte membrane by mixing the organic and inorganic composite with an ion conductive polymer, which constitutes the polymer electrolyte membrane, to manufacture the polymer electrolyte membrane. However, in a drying and firing step for manufacturing the polymer electrolyte membrane after mixing the organic and inorganic composite with the ion conductive polymer, the relatively heavy organic and inorganic composite settles down, and as a result, the non-uniformity is caused and mechanical properties of the polymer electrolyte membrane deteriorate.

Further, a method for manufacturing a polymer electrolyte membrane into a plurality of layers by increasing the number of coating trials for the polymer electrolyte membrane has an increase in process costs and difficulties in process control.

Meanwhile, the cross-over prevention layer of the polymer electrolyte membrane according to the present specification has an advantage in that the introduction method is easily carried out.

The cross-over prevention layer of the polymer electrolyte membrane according to the present specification has an advantage in that physical properties of the polymer electrolyte membrane may be maintained while preventing the cross-over phenomenon because it is possible to control a selective position and the thickness.

The present specification provides an electrochemical battery including a first electrode, a second electrode, and the polymer electrolyte membrane provided between the first electrode and the second electrode.

The first electrode may be a positive electrode or a negative electrode, and the second electrode may be a positive electrode or a negative electrode, which is opposite to the first electrode. That is, when the first electrode is a positive electrode, the second electrode may be a negative electrode, and when the first electrode is a negative electrode, the second electrode may be a positive electrode.

The positive electrode means a cathode which receives electrons and thus is reduced during the discharge, and an anode which is oxidized and thus releases electrons during the charge. The negative electrode means an anode which is oxidized and thus releases electrons during the discharge, and a cathode which receives electrons and is reduced during the charge.

The electrochemical battery means a battery which uses chemical reactions, and is not particularly limited in type as long as the battery includes an electrolyte membrane, but for example, the electrochemical battery may be a fuel cell, a metal secondary battery, or a flow battery.

In the electrochemical battery, the cross-over prevention layer of the polymer electrolyte membrane includes a cationic metal, and the cationic metal may include a metal having a standard electrode potential which ranges from a lower standard electrode potential of standard electrode potentials of the first and second electrodes to a higher standard electrode potential of standard electrode potentials of the first and second electrodes. Specifically, since the cationic metal of the cross-over prevention layer has a standard electrode potential within a potential range of an electrode of an electrochemical battery, the cross-over prevention layer may be formed while the metal cations in the polymer electrolyte membrane is reduced to metal by driving the electrochemical battery.

The present specification provides an electrochemical battery module including an electrochemical battery as a unit cell.

The electrochemical battery module may be formed by inserting a bipolar plate between flow batteries according to one exemplary embodiment of the present application to stack the batteries.

The battery module may be specifically used as a power source for an electric vehicle, a hybrid electric vehicle, a plug-in hybrid electric vehicle, or a power storage device.

The present specification provides a flow battery including: a first electrode which a first electrolyte solution including a first electrode active material is injected into and discharged from; a second electrode which a second electrolyte solution including a second electrode active material is injected into and discharged from; and a polymer electrolyte membrane disposed between the first electrode and the second electrode, in which the polymer electrolyte membrane includes a cross-over prevention layer provided therein.

The flow battery of the present specification may further include: a negative electrode tank and a positive electrode tank which store a negative electrode electrolyte solution and a positive electrode electrolyte solution, respectively; a pump which is connected to the negative electrode tank and the positive electrode tank and supplies the electrolyte solution to a negative electrode or a positive electrode; a negative electrode inlet 31 and a positive electrode inlet 32 through which the negative electrode electrolyte solution and the positive electrode electrolyte solution flow from the pump, respectively; and a negative electrode outlet 41 and a positive electrode outlet 42 through which the electrolyte solution is discharged into the negative electrode tank and the positive electrode tank from a negative electrode 21 and a positive electrode 22, respectively.

The shape of the flow battery is not limited, and may be, for example, a coin-type, a flat plate-type, a cylinder-type, a cone-type, a button-type, a sheet-type, or a laminate-type.

In the flow battery, the cross-over prevention layer of the polymer electrolyte membrane includes a cationic metal, and the cationic metal may include a metal having a standard electrode potential which ranges from a lower standard electrode potential of standard electrode potentials of the first and second electrodes to a higher standard electrode potential of standard electrode potentials of the first and second electrodes.

In a water-based vanadium/vanadium flow battery, the standard electrode potential of an electrode which uses a V(II)/V(III) couple as an active material is −0.25 V, and the standard electrode potential of an electrode which uses a V(IV)/V(V) couple as an active material is +1.0 V, and as a result, a cationic metal of a cross-over prevention layer may have a standard electrode potential of −0.25 V or more and +1.0 V or less, such that the cross-over prevention layer may be formed while the metal cations in the polymer electrolyte membrane are reduced to metal by driving the flow battery.

In a water-based iron/chromium flow battery, the standard electrode potential of an electrode which uses chromium ions as an active material is −0.41 V, and the standard electrode potential of an electrode which uses iron ions as an active material is +0.77 V, and as a result, a cationic metal of a cross-over prevention layer may have a standard electrode potential of −0.41 V or more and +0.77 V or less, such that the cross-over prevention layer may be formed while the metal cations in the polymer electrolyte membrane are reduced to metal by driving the flow battery.

The present specification provides a flow battery module including the flow battery as a unit cell.

The flow battery module may be formed by inserting a bipolar plate between flow batteries according to one exemplary embodiment of the present application to stack the batteries.

The battery module may be specifically used as a power source for an electric vehicle, a hybrid electric vehicle, a plug-in hybrid electric vehicle, or a power storage device.

The flow battery of the present specification may include a first electrode and a second electrode. The first electrode may be a positive electrode or a negative electrode, and the second electrode may be a positive electrode or a negative electrode, which is opposite to the first electrode. That is, when the first electrode is a positive electrode, the second electrode may be a negative electrode, and when the first electrode is a negative electrode, the second electrode may be a positive electrode.

The first electrode means a region where a first electrolyte solution is chemically reacted while being injected into and discharged from a tank and may charge and discharge electric energy, and the second electrode means a region where a second electrolyte solution is chemically reacted while being injected into and discharged from a tank, and may charge and discharge electric energy.

The first electrolyte solution may include a first electrode active material, and the second electrolyte solution may include a second electrode active material.

The first electrode active material may be a positive electrode active material or a negative electrode active material, and the second electrode active material may be a positive electrode active material or a negative electrode active material which is opposite to the first electrode active material. That is, when the first electrode active material is a positive electrode active material, the second electrode active material may be a negative electrode active material, and when the first electrode active material is a negative electrode active material, the second electrode active material may be a positive electrode active material.

The positive electrode active material means a material which receives electrons and thus is reduced during the discharge, and which is oxidized and thus releases electrons during the charge, and the negative electrode active material means a material which is oxidized and thus releases electrons during the discharge, and which receives electrons and thus is reduced during the charge.

The types of flow batteries may be divided according to the type of the electrode active material, and for example, the flow batteries may be classified into a vanadium-based flow battery, a lead-based flow battery, a polysulfide bromine (PSB) flow battery, a zinc-bromine (Zn—Br) flow battery, and the like according to the type of the electrode active material.

The electrode active material may be selected among general materials used in the art.

In an exemplary embodiment of the present specification, the flow battery may use a V(IV)/V(V) couple as a positive electrode active material, and may use a V(II)/V(III) couple as a negative electrode active material.

In another exemplary embodiment of the present specification, the flow battery may use a halogen redox couple as a positive electrode active material, and may use a V(II)/V(III) redox couple as a negative electrode active material.

In still another exemplary embodiment of the present specification, the flow battery may use a halogen redox couple as a positive electrode active material, and may use a sulfide redox couple as a negative electrode active material.

In yet another exemplary embodiment of the present specification, the flow battery may use a halogen redox couple as a positive electrode active material, and may use a zinc (Zn) redox couple as a negative electrode active material.

In the case of a vanadium flow battery, a molar concentration of the electrode active material may be 0.5 M or more and 2 M or less. In other words, a mole number of the electrode active material dissolved in 1 liter of an electrolyte solution may be 0.5 mol or more and 2 mol or less. This is because a precipitate may be formed due to the deterioration in stability of the electrode active material at a temperature of 50° C. or less when the molar concentration of the electrode active material is more than 2 M.

At least one of the first electrolyte solution and the second electrolyte solution may further include a cationic metal salt. The cationic metal salt means a salt which is dissociated into metal cations while being dissolved in a solvent.

The cationic metal of the cationic metal salt may include a metal having a standard electrode potential which ranges from a lower standard electrode potential of standard electrode potentials of the first and second electrodes to a higher standard electrode potential of standard electrode potentials of the first and second electrodes.

The cationic metal salt may include at least one of a nitrate of a cationic metal, a chloride salt of a cationic metal, a sulfide salt of a cationic metal, a sulfate of a cationic metal, and a carbonate of a cationic metal.

The cationic metal salt may include at least one of a nitrate of molybdenum (Mo), tin (Sn), lead (Pb), copper (Cu), mercury (Hg), silver (Ag), or palladium (Pd); a chloride salt of molybdenum (Mo), tin (Sn), lead (Pb), copper (Cu), mercury (Hg), silver (Ag), or palladium (Pd); a sulfide salt of molybdenum (Mo), tin (Sn), lead (Pb), copper (Cu), mercury (Hg), silver (Ag), or palladium (Pd); a sulfate of molybdenum (Mo), tin (Sn), lead (Pb), copper (Cu), mercury (Hg), silver (Ag), or palladium (Pd); and a carbonate of molybdenum (Mo), tin (Sn), lead (Pb), copper (Cu), mercury (Hg), silver (Ag), or palladium (Pd).

When the first electrolyte solution includes a cationic metal salt, a molar concentration of the cationic metal salt in the first electrolyte solution may be 0.001 M or more and 0.1 M or less. In other words, a mole number of the cationic metal salt dissolved in 1 liter of the first electrolyte solution may be 0.001 mol or more and 0.1 mol or less.

When the second electrolyte solution includes a cationic metal salt, a molar concentration of the cationic metal salt in the second electrolyte solution may be 0.001 M or more and 0.1 M or less. In other words, a mole number of the cationic metal salt dissolved in 1 liter of the second ELECTROLYTE solution may be 0.001 mol or more and 0.1 mol or less.

The first electrolyte solution and the second electrolyte solution may each further include a solvent.

The solvent is not particularly limited as long as the solvent may dissolve an electrode active material, and for example, in the case of a vanadium flow battery in which a positive electrode active material is a V(IV)/V(V) redox couple and a negative electrode active material is a V(II)/V(III) redox couple, examples of a solvent capable of dissolving the active materials may include an aqueous sulfuric acid solution, an aqueous chloric acid solution, an aqueous phosphoric acid solution, and a mixed solution thereof.

A molar concentration of acid in the aqueous sulfuric acid solution, the aqueous chloric acid solution, the aqueous phosphoric acid solution, or the mixed solution thereof may be 2 M or more and 4 M or less, and in other words, a mole number of acid in 1 liter of the electrolyte solution may be 2 mol or more and 4 mol or less. In this case, the acid means sulfuric acid, chloric acid, phosphoric acid, or a mixture thereof, and the aqueous sulfuric acid solution, the aqueous chloric acid solution, the aqueous phosphoric acid solution, or the mixed solution thereof refers to an aqueous solution to which sulfuric acid, chloric acid, phosphoric acid, or a mixture thereof is added into distilled water.

The first electrode and the second electrode may each include a porous support. Specifically, a porous support may be provided in each of the first electrode and the second electrode. In other words, the first electrode and the second electrode may be each filled with a porous support.

The porous support may include: a porous metal including at least one of Au, Sn, Ti, Pt—Ti, and IrO—Ti; or a porous carbon including at least one of carbon paper, carbon nanotubes, a graphite felt, and a carbon felt.

At least one of the porous supports provided in the first electrode and the second electrode may include a cationic metal salt on the surface thereof.

The first electrode and the second electrode may each include a carbon felt, or a carbon felt including a cationic metal salt on the surface thereof.

When an electrolyte solution is injected into an electrode including a carbon felt including a cationic metal salt on the surface thereof, the cationic metal salt on the surface thereof may be dissolved out into the electrolyte solution. In this case, the electrolyte solution injected into the electrode including the carbon felt including the cationic metal salt on the surface thereof may include a cationic metal salt dissolved out from the carbon felt.

The first electrolyte solution injected into a first electrode carbon felt may include a cationic metal salt.

The first electrolyte solution injected into the first electrode carbon felt including the cationic metal salt on the surface thereof may include a cationic metal salt dissolved out from the first electrode carbon felt, and the discharged first electrolyte solution may also include the cationic metal salt dissolved out from the first electrode carbon felt.

When the cationic metal salt is provided on the surface of the first electrode carbon felt, the content of the cationic metal salt may be 0.01 wt % or more and 10 wt % or less based on the weight of the first electrode carbon felt.

The second electrolyte solution injected into a second electrode carbon felt may include a cationic metal salt.

The second electrolyte solution injected into the second electrode carbon felt including the cationic metal salt on the surface thereof may include a cationic metal salt dissolved out from the second electrode carbon felt, and the discharged second electrolyte solution may also include the cationic metal salt dissolved out from the second electrode carbon felt.

When the cationic metal salt is provided on the surface of the second electrode carbon felt, the content of the cationic metal salt may be 0.01 wt % or more and 10 wt % or less based on the weight of the second electrode carbon felt.

The cationic metal of the cationic metal salt may include a metal having a standard electrode potential which ranges from a lower standard electrode potential of standard electrode potentials of the first and second electrodes to a higher standard electrode potential of standard electrode potentials of the first and second electrodes.

The cationic metal salt may include at least one of a nitrate of a cationic metal, a chloride salt of a cationic metal, a sulfide salt of a cationic metal, a sulfate of a cationic metal, and a carbonate of a cationic metal.

The cationic metal salt may include at least one of a nitrate of molybdenum (Mo), tin (Sn), lead (Pb), copper (Cu), mercury (Hg), silver (Ag), or palladium (Pd); a chloride salt of molybdenum (Mo), tin (Sn), lead (Pb), copper (Cu), mercury (Hg), silver (Ag), or palladium (Pd); a sulfide salt of molybdenum (Mo), tin (Sn), lead (Pb), copper (Cu), mercury (Hg), silver (Ag), or palladium (Pd); a sulfate of molybdenum (Mo), tin (Sn), lead (Pb), copper (Cu), mercury (Hg), silver (Ag), or palladium (Pd); and a carbonate of molybdenum (Mo), tin (Sn), lead (Pb), copper (Cu), mercury (Hg), silver (Ag), or palladium (Pd).

A method for manufacturing a polymer electrolyte membrane according to a first exemplary embodiment of the present specification may include: installing an electrochemical battery including a first electrode, a second electrode, and a polymer electrolyte membrane provided between the first electrode and the second electrode; injecting a first electrolyte solution including a first electrode active material into a side of the first electrode and injecting a second electrolyte solution including a second electrode active material into a side of the second electrode, in which at least one of the first electrolyte solution and the second electrolyte solution includes metal positive ions; and manufacturing a polymer electrolyte membrane including a cross-over prevention layer formed therein, by operating the electrochemical battery to allow the metal positive ions to permeate into the polymer electrolyte membrane.

A method for manufacturing a polymer electrolyte membrane according to a second exemplary embodiment of the present specification may include: impregnating a polymer electrolyte membrane with a solution including metal cations; installing an electrochemical battery including a first electrode, a second electrode, and the polymer electrolyte membrane provided between the first electrode and the second electrode; and manufacturing a polymer electrolyte membrane including a cross-over prevention layer formed therein by operating the electrochemical battery.

In the manufacturing method, the impregnating of the polymer electrolyte membrane with the solution including metal cations may include: putting the polymer electrolyte membrane into a solution including metal cations and stirring the resulting mixture; taking out the polymer electrolyte membrane from the solution; and drying the polymer electrolyte membrane.

When the polymer electrolyte membrane is put into a solution including metal cations and the resulting mixture is stirred, at least a portion of cations at the end of an ion exchange group of the polymer electrolyte membrane may be substituted with the metal cations in the solution. Specifically, when the polymer electrolyte membrane has an ion exchange group which is $—SO_3^-X^+$, at least a portion of $X^+$ at the end thereof may be substituted with the metal cations in the solution. In this case, $X^+$ is a monovalent cation, and may be, for example, $H^+$ or $Na^+$.

The above-described description on the flow battery may be cited in the method for manufacturing a flow battery.

The metal cation may include at least one of a cation of molybdenum (Mo), a cation of tin (Sn), a cation of lead (Pb), a cation of copper (Cu), a cation of mercury (Hg), a cation of silver (Ag), and a cation of palladium (Pd).

The electrochemical battery may be a flow battery in which the first electrolyte solution is injected into and discharged from the first electrode and the second electrolyte solution is injected into and discharged from the second electrode. In this case, the installing of the electrochemical battery may be installing a flow battery in which the first electrolyte solution is injected into and discharged from the first electrode and the second electrolyte solution is injected into and discharged from the second electrode.

The operating of the electrochemical battery may be charging the electrochemical battery, discharging the electrochemical battery, or charging and discharging the electrochemical battery one or more times.

When the electrochemical battery is a flow battery, the operating of the electrochemical battery may include charging the flow battery, discharging the flow battery, or charging and discharging the flow battery one or more times. According to the state of the electrode active material included in the electrolyte solution before operating the flow battery, the first step of operating the flow battery may be charging the flow battery, or discharging the flow battery.

The metal cations included in the electrolyte solution of the flow battery may permeate into a polymer electrolyte membrane through a charging step one time, a discharging step one time, or a charging and discharging step one or more times, thereby forming a cross-over prevention layer therein. Specifically, the metal cations included in the electrolyte solution may permeate into a polymer electrolyte membrane through a charging step one time, a discharging step one time, or a charging and discharging step one time, thereby forming a cross-over prevention layer therein. More specifically, the metal cations included in the electrolyte solution may permeate into a polymer electrolyte membrane through a charging step one time or a discharging step one time, thereby forming a cross-over prevention layer therein.

According to the state of the electrode active material included in the electrolyte solution before operating the flow battery, the metal cations included in the electrolyte solution may permeate into a polymer electrolyte membrane through a charging step one time or a discharging step one time, thereby forming a cross-over prevention layer therein. That is, only through a charging step one time or a discharging step one time, the entirety or a part of the metal cations of the electrolyte solution may permeate into a polymer electrolyte membrane, thereby forming a cross-over prevention layer inside the polymer electrolyte membrane.

It is possible to further include operating an electrochemical battery including a polymer electrolyte membrane including a cross-over prevention layer formed therein immediately after the manufacturing of the polymer electrolyte membrane including the cross-over prevention layer formed therein.

When the electrochemical battery is a flow battery, it is possible to further include operating the flow battery including the polymer electrolyte membrane including the cross-over prevention layer formed therein consecutively after the forming of the cross-over prevention layer. That is, after a cross-over prevention layer is formed inside a polymer electrolyte membrane, it is possible to immediately charge and discharge a flow battery without a process of adding or removing a composition and a configuration or a process of re-installing the polymer electrolyte membrane including the cross-over prevention layer in another flow battery.

It is possible to further include removing the polymer electrolyte membrane including the cross-over prevention layer formed therein from the electrochemical battery after the manufacturing of the polymer electrolyte membrane including the cross-over prevention layer formed therein.

When the electrochemical battery operated to form the cross-over prevention layer is a flow battery, it is possible to remove the polymer electrolyte membrane from the flow battery after manufacturing the polymer electrolyte membrane in which the cross-over prevention layer is formed.

When the electrochemical battery is a flow battery, the first electrode active material and the second electrode active material may be a vanadium-based active material.

The present specification provides an electrolyte solution for a flow battery, which includes an electrode active material and a cationic metal salt.

The cationic metal salt may include at least one of a nitrate of a cationic metal, a chloride salt of a cationic metal, a sulfide salt of a cationic metal, a sulfate of a cationic metal, and a carbonate of a cationic metal.

The cationic metal salt may include at least one of a nitrate of molybdenum (Mo), tin (Sn), lead (Pb), copper (Cu), mercury (Hg), silver (Ag), or palladium (Pd); a chloride salt of molybdenum (Mo), tin (Sn), lead (Pb), copper (Cu), mercury (Hg), silver (Ag), or palladium (Pd); a sulfide salt of molybdenum (Mo), tin (Sn), lead (Pb), copper (Cu), mercury (Hg), silver (Ag), or palladium (Pd); a sulfate of molybdenum (Mo), tin (Sn), lead (Pb), copper (Cu), mercury (Hg), silver (Ag), or palladium (Pd); and a carbonate of molybdenum (Mo), tin (Sn), lead (Pb), copper (Cu), mercury (Hg), silver (Ag), and palladium (Pd).

A molar concentration of the cationic metal salt in the electrolyte solution may be 0.001 M or more and 0.1 M or less.

MODE FOR INVENTION

Hereinafter, the present specification will be described in more detail through Examples. However, the following Examples are provided only for exemplifying the present specification, but are not intended to limit the present specification.

EXAMPLES

Example 1

50 ml of a positive electrode electrolyte solution obtained by adding 1 M tetravalent vanadium as a positive electrode active material to a 3 M aqueous sulfuric acid solution was prepared. After 0.01 M (0.085 g) of silver nitrate as a cationic metal salt was further added thereto, the resulting mixture was vigorously stirred for 30 minutes to completely dissolve silver nitrate.

50 ml of a negative electrode electrolyte solution obtained by adding 1 M trivalent vanadium as a negative electrode active material to a 3 M aqueous sulfuric acid solution was prepared.

Nafion 115 (127 μm) was used as a polymer electrolyte membrane, and a carbon felt was used as an electrode support.

A polymer electrolyte membrane in which a silver layer was introduced was obtained by charging a unit cell having an active area of 50×50 mm up to 1.7 V at a current of 50 mA/cm$^2$ while circulating and supplying the positive and negative electrode electrolyte solutions to the unit cell at a flow rate of 25 ml/min.

Example 2

50 ml of a positive electrode electrolyte solution obtained by adding 1 M pentavalent vanadium as a positive electrode active material to a 3 M aqueous sulfuric acid solution was prepared. After 0.01 M (0.085 g) of silver nitrate as a cationic metal salt was further added thereto, the resulting mixture was vigorously stirred for 30 minutes to completely dissolve silver nitrate.

50 ml of a negative electrode electrolyte solution obtained by adding 1 M divalent vanadium as a negative electrode active material to a 3 M aqueous sulfuric acid solution was prepared.

Nafion 115 (127 μm) was used as a polymer electrolyte membrane, and a carbon felt was used as an electrode support.

A polymer electrolyte membrane in which a silver layer was introduced was obtained by discharging a unit cell having an active area of 50×50 mm up to 0.8 V at a current of 50 mA/cm$^2$ while circulating and supplying the positive and negative electrode electrolyte solutions to the unit cell at a flow rate of 25 ml/min.

Example 3

A unit cell was manufactured in the same manner as in Example 1, except that the amount of silver nitrate added to the positive electrode electrolyte solution was changed to 0.005 M, and then the unit cell was continuously charged and discharged 30 times.

Example 4

A unit cell was manufactured in the same manner as in Example 1, except that the amount of silver nitrate added to the positive electrode electrolyte solution was changed to 0.015 M, and then the unit cell was continuously charged and discharged 30 times.

Example 5

300 ml of a 0.01 M aqueous ion exchange solution was prepared by using silver nitrate ($AgNO_3$). Nafion 115 with a size of 6.5 cm×6.5 cm being a polymer electrolyte membrane was put into the aqueous ion exchange solution, and then the resulting mixture was stirred for 100 hours. The Nafion 115 was taken out, washed with distilled water, and then dried at 50° C. in a hot wind oven.

50 ml of a positive electrode electrolyte solution obtained by adding 1 M tetravalent vanadium as a positive electrode active material to a 3 M aqueous sulfuric acid solution was prepared, and 50 ml of a negative electrode electrolyte solution obtained by adding 1 M trivalent vanadium as a negative electrode active material to a 3 M aqueous sulfuric acid solution was prepared.

Nafion 115 treated with an aqueous ion exchange solution was used as a polymer electrolyte membrane, and a carbon felt was used as an electrode support.

A polymer electrolyte membrane in which a silver layer was introduced was obtained by charging up to 1.7 V and discharging up to 0.8 V a unit cell having an active area of 50×50 mm up, respectively, at a current of 50 mA/cm$^2$ while circulating and supplying the positive and negative electrode electrolyte solutions to the unit cell at a flow rate of 25 ml/min.

Example 6

A polymer electrolyte membrane into which a copper layer was introduced was obtained by performing the manufacture in the same manner as in Example 5, except that 300 ml of a 0.01 M aqueous ion exchange solution to which CuSO$_4$ was added instead of silver nitrate was used.

Example 7

A polymer electrolyte membrane into which a lead layer was introduced was obtained by performing the manufacture in the same manner as in Example 5, except that 300 ml of a 0.01 M aqueous ion exchange solution to which Pb(NO$_3$)$_2$ was added instead of silver nitrate was used.

Comparative Example 1

A unit cell was manufactured in the same manner as in Example 1, except that silver nitrate was not added to the positive electrode electrolyte solution.

Experimental Example 1

The charge and discharge capacities (mAh) were measured by continuously charging and discharging the unit cells in Example 1 and Comparative Example 1 from 0.8 V to 1.7 V at a current of 50 mA/cm$^2$ 120 times, and a measured graph is illustrated in FIG. 2.

Through the graph, it can be confirmed that as the charge and discharge are repeated, a pattern in which the battery capacity is increased is obtained, and it can be seen that Example 1 has a value of 87.6% even in terms of energy efficiency and thus has a better performance by approximately 1% than a value of 86.7% in Comparative Example 1.

The charge and discharge capacities (mAh) were measured by continuously charging and discharging the unit cells in Example 5 and Comparative Example 1 from 0.8 V to 1.7 V at a current of 50 mA/cm$^2$ 150 or more times, a measured graph is illustrated in FIG. 8, and the results of the efficiency during the 150th charge and discharge are shown in the following Table 1.

TABLE 1

| @150th cycle | Current efficiency (CE %) | Voltage efficiency (VE %) | Energy efficiency (EE %) |
| --- | --- | --- | --- |
| Comparative Example 1 | 96.3 | 89.7 | 86.4 |
| Example 5 | 97.7 | 90.4 | 88.3 |

The unit cells in Example 7 and Comparative Example 1 were continuously charged and discharged from 0.8 to 1.7 V at a current of 50 mA/cm$^2$ 5 times, and the results for the efficiency during the charge and discharge are shown in the following Table 2.

TABLE 2

| @5th cycle | Discharge capacity, mAh | Current efficiency (CE %) | Voltage efficiency (VE %) | Energy efficiency (EE %) |
| --- | --- | --- | --- | --- |
| Comparative Example 1 | 1239 | 97.3% | 89.8% | 87.4% |
| Example 7 | 1256 | 97.7% | 91.1% | 89.0% |

Experimental Example 2

After the charging of the unit cell one time in Example 1 was completed, the polymer electrolyte membrane in which the silver layer was introduced was recovered, and then charge and discharge were performed 35 times under the same unit cell conditions without adding silver nitrate to the positive electrode electrolyte solution.

The results are illustrated in FIG. 3 and FIG. 4, the performances in all the cycles were equal to or better than those in Comparative Example 1, and the energy efficiency was 87.8%.

Through the results, it can be confirmed that when the polymer electrolyte membrane in which the silver layer was introduced was used while being filled with a new electrolyte solution, the initial performance can be exhibited.

Experimental Example 3

After the unit cell was continuously charged and discharged 30 times in Example 4, the polymer electrolyte membrane was recovered, and the cross section thereof in a thickness direction was observed by an optical microscope. The results are illustrated in FIG. 5.

Experimental Example 4

After the unit cell was continuously charged and discharged 30 times in Example 4, the polymer electrolyte membrane was recovered, the cross section thereof in a thickness direction was observed by a scanning electron microscope (SEM), an energy dispersive x-ray spectroscopy (EDS) component analysis was additionally carried out, and the results are each illustrated in the left and right sides of FIG. 6.

Meanwhile, the line mapping was additionally carried out, and the results are illustrated in FIG. 7. In this case, the yellowish green color indicates Ag, and the red color indicates fluorine of the polymer electrolyte membrane.

When the thickness of the silver layer in the total thickness of 127 µm of the Nafion is about 25 µm, and the negative electrode interface and the positive electrode interface are assumed to be a point of 0 and a point of 100, respectively, it can be seen that the silver layer is formed at a point of 8 to 35, and that the layer is more intensively formed at a point of 25 to 35.

Consequently, it can be seen that for the silver layer being a cross-over prevention layer, a new layer is formed toward the inner part of the thickness direction of the polymer electrolyte membrane instead of a surface deposition.

Experimental Example 5

The results of measuring the X-ray diffraction (XRD) of the polymer electrolyte membrane manufactured in Example 1 at the negative electrode side thereof are illustrated in FIG. 9. As a result, a peak appeared at the same position as the crystalline peak (red color) of silver, and through the observation, it can be seen that a silver layer is formed inside the polymer electrolyte membrane.

The invention claimed is:
1. A polymer electrolyte membrane comprising:
an ion conductive polymer having a thickness,
wherein a cross-over prevention layer is present inside the ion conductive polymer at 10% or more and 90% or less of the thickness of the ion conductive polymer,
wherein the cross-over prevention layer has a thickness of 1 µm or more and 100 µm or less;

wherein the cross-over prevention layer comprises a nitrate of a cationic metal, wherein the cationic metal comprises at least one of tin (Sn), lead (Pb), mercury (Hg), and silver (Ag).

2. The polymer electrolyte membrane of claim 1, wherein the cross-over prevention layer is parallel to a surface perpendicular to a thickness direction of the polymer electrolyte membrane.

3. An electrochemical battery comprising:
a first electrode;
a second electrode; and
the polymer electrolyte membrane according to claim 1 provided between the first electrode and the second electrode.

4. The electrochemical battery of claim 3, wherein a cross-over prevention layer of the polymer electrolyte membrane comprises a cationic metal, and
the cationic metal comprises a metal having a standard electrode potential which ranges from a lower standard electrode potential of standard electrode potentials of the first and second electrodes to a higher standard electrode potential of standard electrode potentials of the first and second electrodes.

5. An electrochemical battery module comprising the electrochemical battery of claim 3 as a unit cell.

6. A flow battery comprising:
a first electrode which a first electrolyte solution comprising a first electrode active material is capable of being injected into and discharged from;
a second electrode which a second electrolyte solution comprising a second electrode active material is capable of being injected into and discharged from; and
the polymer electrolyte membrane according to claim 1 which is disposed between the first electrode and the second electrode.

7. The flow battery of claim 6, wherein at least one of the second electrolyte solution and the first electrolyte solution comprises a cationic metal salt.

8. The flow battery of claim 7, wherein the cationic metal salt comprises at least one of a nitrate of molybdenum (Mo), tin (Sn), lead (Pb), copper (Cu), mercury (Hg), silver (Ag), or palladium (Pd); a chloride salt of molybdenum (Mo), tin (Sn), lead (Pb), copper (Cu), mercury (Hg), silver (Ag), or palladium (Pd); a sulfide salt of molybdenum (Mo), tin (Sn), lead (Pb), copper (Cu), mercury (Hg), silver (Ag), or palladium (Pd); a sulfate of molybdenum (Mo), tin (Sn), lead (Pb), copper (Cu), mercury (Hg), silver (Ag), or palladium (Pd); and a carbonate of molybdenum (Mo), tin (Sn), lead (Pb), copper (Cu), mercury (Hg), silver (Ag), or palladium (Pd).

9. The flow battery of claim 6, wherein the first electrode and the second electrode each comprise a carbon felt or a carbon felt comprising a cationic inorganic salt on a surface thereof.

10. The flow battery of claim 9, wherein when a cationic inorganic salt is provided on a surface of the first electrode carbon felt, a content of the cationic inorganic salt is 0.01 wt % or more and 10 wt % or less based on a weight of the first electrode carbon felt, and
when a cationic inorganic salt is provided on a surface of the second electrode carbon felt, a content of the cationic inorganic salt is 0.01 wt % or more and 10 wt % or less based on a weight of the second electrode carbon felt.

11. A method for manufacturing a polymer electrolyte membrane, the method comprising:

installing an electrochemical battery comprising a first electrode, a second electrode, and a polymer electrolyte membrane provided between the first electrode and the second electrode;
injecting a first electrolyte solution comprising a first electrode active material into a side of the first electrode and injecting a second electrolyte solution comprising a second electrode active material into a side of the second electrode, wherein at least one of the first electrolyte solution and the second electrolyte solution comprises metal cations; and
manufacturing a polymer electrolyte membrane comprising a cross-over prevention layer formed therein, by operating the electrochemical battery to allow the metal cations to permeate into the polymer electrolyte membrane,
wherein the polymer electrolyte membrane comprises:
an ion conductive polymer having a thickness,
wherein a cross-over prevention layer is present inside the ion conductive polymer at 10% or more and 90% or less of the thickness of the ion conductive polymer,
wherein the cross-over prevention layer has a thickness of 1 μm or more and 100 μm or less,
wherein the cross-over prevention layer comprises a nitrate of a cationic metal, wherein the cationic metal comprises at least one of tin (Sn), lead (Pb), mercury (Hg), and silver (Ag).

12. The method of claim 11, wherein the metal cation comprises a metal having a standard electrode potential which ranges from a lower standard electrode potential of standard electrode potentials of the first and second electrodes to a higher standard electrode potential of standard electrode potentials of the first and second electrodes.

13. The method of claim 11, wherein the metal cation comprises at least one of a cation of molybdenum (Mo), a cation of tin (Sn), a cation of lead (Pb), a cation of copper (Cu), a cation of mercury (Hg), a cation of silver (Ag), and a cation of palladium (Pd).

14. The method of claim 11, further comprising:
operating an electrochemical battery comprising a polymer electrolyte membrane comprising a cross-over prevention layer formed therein immediately after the manufacturing of the polymer electrolyte membrane comprising the cross-over prevention layer formed therein.

15. The method of claim 11, wherein the electrochemical battery is a flow battery in which a first electrolyte comprising a first electrode active material is injected into and discharged from the first electrode and a second electrolyte comprising a second electrode active material is injected into and discharged from the second electrode.

16. A method for manufacturing a polymer electrolyte membrane, the method comprising:
impregnating a polymer electrolyte membrane with a solution comprising metal cations;
installing an electrochemical battery comprising a first electrode, a second electrode, and the polymer electrolyte membrane provided between the first electrode and the second electrode; and
manufacturing a polymer electrolyte membrane comprising a cross-over prevention layer formed therein by operating the electrochemical battery,
wherein the polymer electrolyte membrane comprises:
an ion conductive polymer having a thickness,
wherein a cross-over prevention layer is present inside the ion conductive polymer at 10% or more and 90% or less of the thickness of the ion conductive polymer, wherein the cross-over prevention layer has a thickness of 1 μm or more and 100 μm or less,
wherein the cross-over prevention layer comprises a nitrate of a cationic metal, wherein the cationic metal comprises at least one of tin (Sn), lead (Pb), mercury (Hg), and silver (Ag).

* * * * *